(12) United States Patent
Ueta

(10) Patent No.: US 8,240,678 B2
(45) Date of Patent: Aug. 14, 2012

(54) CONNECTING STRUCTURE OF METAL PLATES

(75) Inventor: Kosaku Ueta, Kumagaya (JP)

(73) Assignee: Japan Metal Gasket Co., Ltd., Saitama (JP)

( * ) Notice: Subject to any disclaimer, the term of this patent is extended or adjusted under 35 U.S.C. 154(b) by 616 days.

(21) Appl. No.: 12/377,161

(22) PCT Filed: Dec. 18, 2006

(86) PCT No.: PCT/JP2006/325173
§ 371 (c)(1),
(2), (4) Date: Feb. 11, 2009

(87) PCT Pub. No.: WO2008/023448
PCT Pub. Date: Feb. 28, 2008

(65) Prior Publication Data
US 2009/0311551 A1 Dec. 17, 2009

(30) Foreign Application Priority Data
Aug. 22, 2006 (JP) ................ 2006-225836

(51) Int. Cl.
*F16J 15/12* (2006.01)
*B23P 11/00* (2006.01)
*F02F 11/00* (2006.01)

(52) U.S. Cl. ........ 277/630; 277/598; 29/432.2; 29/21.1; 29/509

(58) Field of Classification Search .................. 277/630, 277/598; 29/432.2, 21.1, 509
See application file for complete search history.

(56) References Cited

U.S. PATENT DOCUMENTS

| | | | | | |
|---|---|---|---|---|---|
| 2,135,807 A | * | 11/1938 | Fitzgerald | ............ | 428/591 |
| 2,254,558 A | | 9/1941 | Williams | | |
| 2,924,312 A | * | 2/1960 | Williams | ............ | 403/283 |
| 3,726,000 A | * | 4/1973 | Hafner | ............ | 29/21.1 |
| 3,900,937 A | * | 8/1975 | Schleicher | ............ | 29/566.1 |
| 3,934,327 A | * | 1/1976 | Hafner | ............ | 29/432 |

(Continued)

FOREIGN PATENT DOCUMENTS

JP          56-123775          9/1981

(Continued)

OTHER PUBLICATIONS

International Search Report, International Application No. PCT/JP2006/325173, mailed Feb. 20, 2007.

(Continued)

*Primary Examiner* — Alison Pickard
(74) *Attorney, Agent, or Firm* — Young Basile

(57) ABSTRACT

Provided is a connecting structure in which it is difficult for a crack to occur, even if a connection location is set in a portion on which concentrated tensile stress may occur. Laminated metal plates are concurrently punched out downward in shape of tongue piece. A depth of punch-out is not smaller than a total thickness of the laminated metal plates. A tongue piece portion is punched out in shape of cantilever beam while a central connection portion is left behind. The tongue piece portion is bent downward in the out-of-plane direction at a connection portion linking to the central connection portion in order that a location of the tongue piece portion in the extension direction on its way is parallel to a bend line. The tongue piece portion is configured to widen in width gradually toward a front end thereof.

10 Claims, 6 Drawing Sheets

U.S. PATENT DOCUMENTS

| | | | | |
|---|---|---|---|---|
| 5,408,735 | A | * | 4/1995 | Schleicher .................. 29/432.2 |
| 5,621,961 | A | * | 4/1997 | Schleicher ..................... 29/509 |
| 5,979,035 | A | * | 11/1999 | Tahara et al. ................ 29/432.2 |
| 6,115,905 | A | | 9/2000 | Ueta |
| 6,131,005 | A | | 10/2000 | Ozawa |
| 7,059,610 | B2 | * | 6/2006 | Hegmann ..................... 277/598 |

FOREIGN PATENT DOCUMENTS

| | | |
|---|---|---|
| JP | 56-123775 U | 9/1981 |
| JP | 7-185695 A | 7/1995 |
| JP | 09-141351 | 6/1997 |
| JP | 10-235440 | 9/1998 |
| JP | 11-047854 | 2/1999 |
| JP | 11-165448 | 6/1999 |
| JP | 2002-364685 | 12/2002 |

OTHER PUBLICATIONS

Office Action dated Aug. 17, 2011 issued by the Chinese Patent Office for the corresponding Chinese Patent Application No. 200680055263.3, together with an English translation of the Office Action.

Korean Patent Office Action dated Feb. 18, 2011 from corresponding Korean Patent Application No. 10-2009-7002884 and an English translation thereof.

Notification of Transmittal and English Translation of the International Preliminary Report on Patentability, International Application No. PCT/JP2006/325173, mailed Apr. 16, 2009.

* cited by examiner

CONNECTING STRUCTURE OF METAL PLATES

FIELD OF THE INVENTION

The present invention relates in general to a connection of a plurality of laminated, thin metal plates with each other, and particularly to a connecting structure of metal plates suitably applicable to a metal gasket formed by laminating a plurality of metal plates composed of one or more base plates and subplates and the like.

BACKGROUND

In a metal gasket formed by laminating a plurality of metal plates, a connecting structure for connecting all or a part of the plurality of the laminated metal plates with each other includes a conventional structure, for example, disclosed in Japanese Patent Publication JP10-235440A. In this structure, laminated metal plates are connected with each other in such a manner that in a connection portion, the laminated metal plates are cut along two main section lines independent from each other to be cut with two lines, and a metal portion between the two main section lines is extended and evaginated to project in the lamination direction (thickness direction), forming a protrusion portion so that the metal portion may provide a larger stepped difference than a thickness of the laminated plates. In addition, in cutting, the plates are punched out with a wider clearance to a mold than usual, and many burrs are generated on the cutting surface, and/or a property of material with high hardness is used to widen the burrs larger than the cutting surface after cutting, and further punched out portions engage with one another due to the widened burrs and may not return to a punched hole, thus the metal plates may be kept locked.

Here, in a conventional art, a metal gasket is provide with a projecting portion in the outer circumference thereof so that a part of the metal gasket is situated outside a connection surface of an engine having the metal gasket mounted, and a connection location is set in this projecting portion to connect. However, as an engine grows smaller in size and more sophisticated, and according to adoption of a wet liner or open deck technology in a cylinder block as a cooling method against a high temperature, and further in order to take a countermeasure against lowering in bearing stress generated around a combustion chamber hole, a gasket which raises the bearing stress by installing more shim plates around the combustion chamber hole has been increasingly used. Considering these circumstances, the connection method above has been used when a plurality of metal plates constituting a gasket are connected with each other in a region where a water conduit opening is provided around the combustion chamber hole.

However, if the connection location is set in a region where a water conduit opening is provided in the connection surface of an engine, a crack may occur from the relevant connection location depending on conditions of an intended engine, because cyclic, tensile and compressive load is applied due to engine operation.

For example, a compression ratio and/or combustion temperature etc. is raised in an engine which is miniaturized, sophisticated and/or has a large-volume, etc., it is required to increase a cooling efficiency of a cylinder block and decrease a manufacturing cost, and a wet liner or open deck technology etc. is adopted, so as the result, in a cylinder block of an engine, a combustion chamber hole's side of the engine and a bolt-hole portion outside a water conduit opening are separated at a location for forming a water conduit opening in a connection surface opposed to a metal gasket, where the combustion chamber hole's side and an outer portion from the location for forming a water conduit opening are communicated with each other through a bottom of the water conduit opening. Further, a metal gasket mounted between the cylinder block and a cylinder head of such an engine is arranged to receive the highest load (bearing stress) applied to the gasket around the combustion chamber hole. In addition, the outside of the location for forming a water conduit opening is fastened with a clamping bolt, then load applied near a bolt-hole on the outside straddling the location for forming a water conduit opening becomes approximately equal to that around the combustion chamber hole, and the bearing stress decrease gradually apart from the bolt-hole, though in a different manner depending on rigidity of the engine except in a region near the bolt-hole. Under these conditions above imposed concurrently, it has been observed that because the combustion chamber hole's side of the location for forming a water conduit opening and the outside of the location for forming a water conduit opening are separated at the location for forming a water conduit opening, they move differently from one another depending on conditions in engine operation.

At this time, in the conventional connecting structure, work is applied in which, so as to leave behind outsides of a base plate within a range to be connected, two or more notches are cut out between the outsides to generate a burr, and the plate on the side cut out is extended to be evaginated in shape of trapezoid having a partially flat portion in the central portion. Particularly, when a gasket is formed of material with high rigidity, because a connection location is set inside a location for forming a water conduit opening (a location overlapped with a water jacket of a cylinder block), a size of the connection location is limited, and when a connection portion is small and the evaginated portion is evaginated beyond a thickness of the gasket, then its rising-edge portion is extended forcibly to have residual tensile stress.

Further, in a method of the relevant conventional technology, because a shear plane finally cut out is perpendicular to a rising-plane of the gasket plane, tensile stress is generated to concentrate in a cutting surface formed by final shearing. When the gasket under these conditions is mounted on an engine and fastened with a clamping bolt, and the engine is operated, then a portion connected, which is released in both of a cylinder block surface and a cylinder head surface, or only in the cylinder block surface within a range of a water conduit opening, in either case, is in a freely movable state within the range of a water conduit opening, and when the engine moves differently between in an inner circumference and outer circumference of the water conduit opening as described above, then in a connected gasket within the location for forming a water conduit opening, a crack may occur in a gasket base plate from a base point which is the cutting portion by final shearing where stress stays behind, due to compressive and/or tensile stress and vibration repeatedly produced from operation. Development of the crack with time may damage a function of the gasket.

BRIEF SUMMARY

Disclosed herein are embodiments of a connecting structure for two or more metal plates. One such embodiment comprises two or more metal plates laminated together, a connection portion of the two or more laminated plates, a first bend line, a tongue piece portion formed by cutting concurrently the laminated metal plates in a thickness direction in a tongue-like shape from the connection portion. The tongue piece comprises a body portion bent at an angle in an out-of-planar direction from the connection portion at the first bend line, and a length of the bend line is smaller in length than a maximal width of the tongue piece portion measured parallel to the bend line. A bend depth of the tongue piece portion in the out-of-plane direction is equal to or greater than a total thickness of the laminated metal plates.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

The embodiments disclosed herein are made considering the aforementioned issues and provides a connecting structure of metal plates in which it is difficult for a crack to occur, even if a connection location is set in a portion where tensile stress and/or compressive stress is generated to concentrate.

Figure 1:
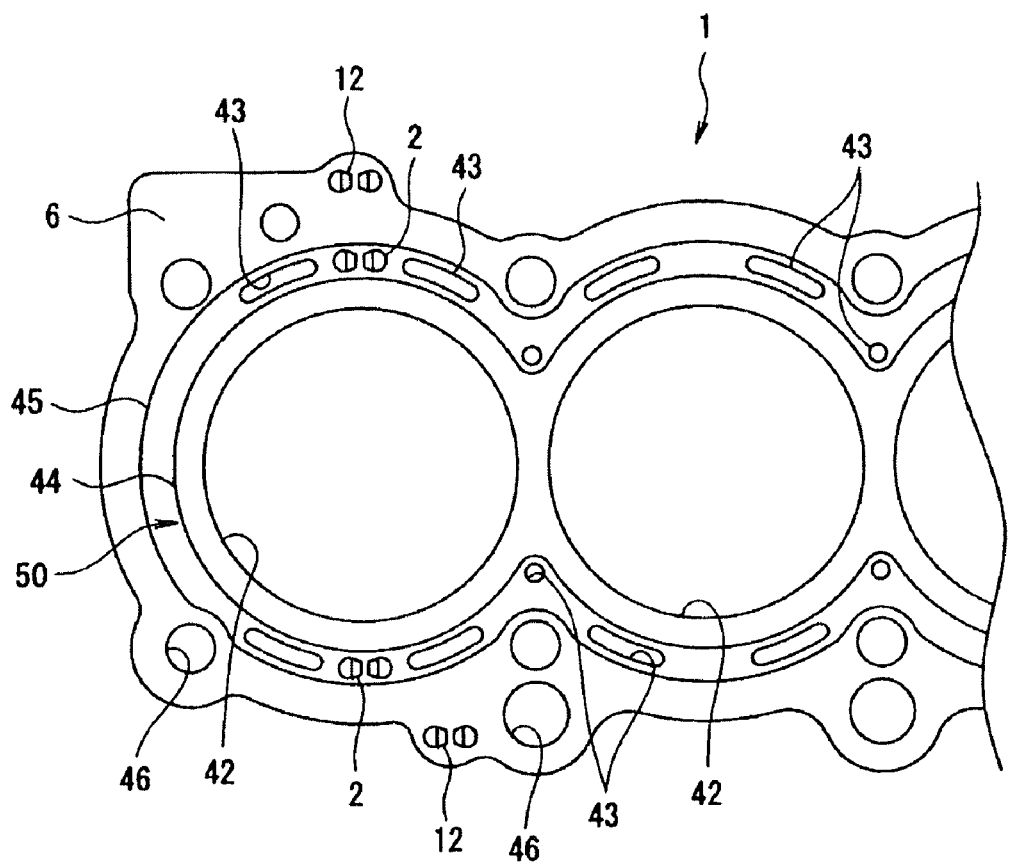
FIG. 1 is a plan view illustrating a metal gasket of an embodiment as disclosed herein.

A first embodiment will be explained with reference to the drawings. As illustrated in FIG. 1, a metal gasket 1 is placed between opposing surfaces of a cylinder block and cylinder head in an engine (not shown), and a combustion chamber hole 42 is open into the metal gasket 1 corresponding to the cylinder of an engine, as described below. In the cylinder block, a water jacket is provided in an outer circumference of the cylinder to cover entirely the outer circumference of the relevant cylinder, allowing cooling water to flow through. In the metal gasket 1, a plurality of water conduit openings 43 are open into a part of a region overlapping with the water jacket, called a water-cooling region 50. A total area of the plurality of the water conduit openings 43 is arranged to be smaller than a planar area of the water jacket, in order to throttle a flow of water supplied by the cylinder block to the cylinder head to adjust. In addition, on the side of the cylinder head, the water jacket only with an opening area in communication with the water conduit openings 43 is provided. Considering this, in the metal gasket 1, corresponding to the water-cooling region 50 where the water jacket of the cylinder block is situated under the metal gasket 1, a connection location 2 is set as described below. The cylinder block is formed of, for example, aluminum alloy for weight saving, and a peripheral wall of the cylinder is provided with a cast-iron sleeve.

This metal gasket 1 includes a base plate 6 and a shim plate 9. The base plate 6 is composed of a thin metal plate, and in its central portion, a plurality of combustion chamber holes 42 are open along its longitudinal direction. A first seal line 44 is provided to surround the combustion chamber holes 42, a second seal line 45 is provided outside the first seal line 44 to surround the combustion chamber holes 42 and the first seal line 44, and beads are formed along the first and second seal line 44 and 45 respectively. A region between the first and second seal line 44 and 45 is the water-cooling region 50 opposed to the water jacket on the side of the cylinder block, and the beads of the first seal line 44 prevents the cooling water from moving to the side of the combustion chamber holes 42 and the second seal line 45 prevents the cooling water from flowing to the outside (the side of a bolt-hole 46). Further, in the water-cooling region 50, the plurality of the water conduit openings 43 are open along the combustion chamber holes 42.

In this embodiment, the shim plate 9 is laminated under the base plate 6. The shim plate 9 is disposed at least in an outer circumference of the combustion chamber holes 42 of the substrate 6 and a region overlapped with the water-cooling region 50 to raise bearing stress higher in the outer circumference of the combustion chamber hole 42. Mere, as raw material of thin metal plate for forming the base plate 6 and the shim plate 9, for example, a stainless steel plate, mild steel plate, aluminum plate or the like is arbitrarily usable.

Next, a connecting structure of the base plate 6 and the shim plate 9 which are laminated metal plates will be explained. In the following explanation, an example in which the metal gasket 1 is composed of one base plate 6 and shim plate 9 is illustrated, but the metal gasket 1 may be configured in a manner that the shim plate 9 is disposed between two base plates 6 or a separate subplate thicker than the base plate 6 is laminated to adjust a thickness. That is, the number of metal plate to be laminated is not limited to two, and it may be three or more.

Figure 2:
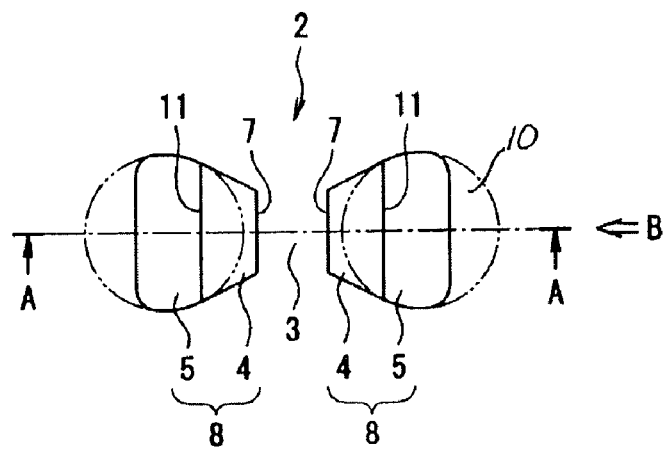
FIG. 2 is a plan view illustrating a connection location of an embodiment as disclosed herein.
Figure 3:
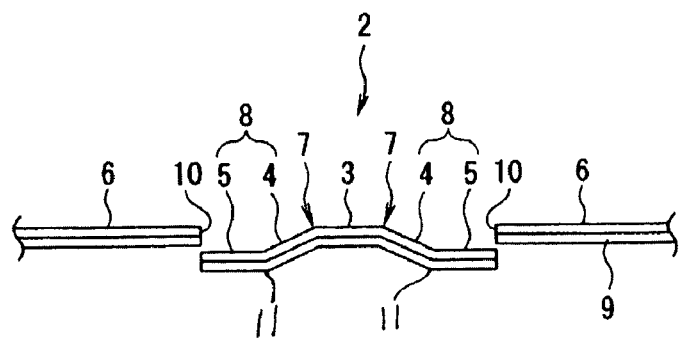
FIG. 3 is a cross-section view taken along the A-A line in FIG. 2.
Figure 4:
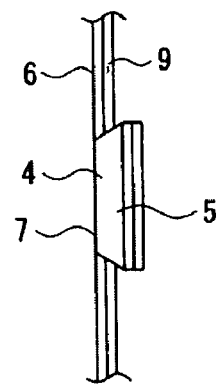
FIG. 4 is a schematic view seen from B in FIG. 2.

In this embodiment, shown in FIGS. 2-4, the connection location 2 is set at a plurality of locations where the water conduit opening 43 is not open into the water-cooling region 50 opposed to the water jacket of the cylinder block. Laminated metal plates (the base plate 6 and shim plate 9) are concurrently punched out using a press downward (in the lamination direction) in shape of tongue pieces on both sides of a central portion of an area to be connected (hereinafter, called a central connection portion 3). A depth of punch-out is more than a total thickness of the laminated metal plates 6 and 9. That is, to form each side of the central connection portion 3 in shape of cantilever beam while the central connection portion 3 is left behind, the laminated metal plates are punched out by cutting out on one section line along a tongue piece-like outline contour.

A tongue piece-like portion formed by punch-out is called a tongue piece portion 8, and an opening formed by punch-out is called a tongue piece opening 10. In punch-out, a press die is defined so that the tongue piece portion 8 is bent downward in the out-of-plane direction at its root portion, i.e. a bend line 7 linked to the central connection portion 3, and also bent to make an inclined portion 4 on its way in the extension direction of the tongue piece portion 8 to a bend line 11 of the tongue piece portion parallel to a bend line 7 of the connection portion, providing a stepped difference. Further, a front end 5, also called a planar portion 5, outside the bend line 11 is arranged to be situated under a lower surface of the undermost metal plate 9 of the laminated metal plates 6 and 9, and parallel to the periphery of the tongue piece opening 10, as shown in FIG. 3. A punch-out width is set so that a width of the tongue piece portion 8 punch-out is arranged to be narrowest in the connection portion 3 and widen gradually toward the front end 5 of the tongue piece portion 8. The width can taper off at the end of the front end 5, for example, and may be rounded.

In the connecting structure, because the laminated metal plates 6 and 9 are cut out on the right and left side straddling the central connection portion 3 to form the tongue piece portion 8, the right and left tongue piece portions 8 are bent downward in the out-of-plate direction respectively, and in the central connection portion 3, due to bending of the tongue piece portion 8, then the laminated metallic bodies 6, 9 may be prevented from relative displacement to each other in the horizontal direction perpendicular to the lamination direction. That is, if the laminated metal plates 6, 9 are displaced relatively to each other in the horizontal direction, the inclined portion 4 formed on the root side of the tongue piece portion 8 may block horizontal displacement between the metal plates 6, 9.

Figure 5:
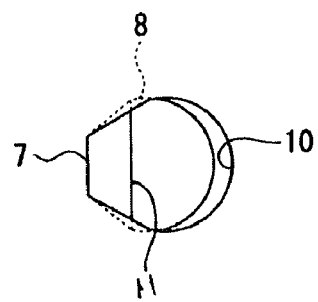
FIG. 5 is a schematic view illustrating relation between a tongue piece portion and a tongue piece opening.

If the laminated metal plates 6, 9 are displaced in the lamination direction, coming loose may be prevented because the tongue piece portion 8 cut out by punch-out is configured so that the connection portion 3 on the root side is narrowest and widens gradually toward a front end thereof. Seen from relation between the tongue piece portion 8 bent downward and the tongue piece opening 10 after cutting off, in a plain view, as shown in a schematic depiction of FIG. 5, since the tongue piece portion 8 is bent downward, the tongue piece portion 8 is in a state with being pulled in on the side of the connection portion and further the width of the tongue piece portion 8 widens gradually toward a front end thereof, that is, it is narrowest at the bend line 7 on the root side, then both sides of the tongue piece portion 8 in the width direction become overlapped with an outer circumference of the tongue piece opening 10 in the lamination direction. As the result, if the metal plates are displaced in the lamination direction, both sides of the tongue piece portion 8 in the width direction abut on a lower surface of the outer circumference of the tongue piece opening 10, preventing coming loose. This is illustrated in FIG. 5.

In the connecting structure of this embodiment, because a plate is not evaginated, or turned inside out, resulting in residual stress as is conventional, and only both sides of the laminated metal plates 6, 9 are carved out toward one side respectively to form the tongue piece portions 8 in shape of cantilever beam and bend them, then no or small internal stress is generated anywhere. That is, in work, only shearing is used to form connection, resulting in no residual stress. In addition, as is conventional, in shearing of the tongue piece portion 8, it is not necessary to generate a burr after punch-out due to a larger clearance in a mold, but if a further stronger connection is required, this means may be also used.

Here, if there is stress concentration, it may occur in the connection portion of the root side of the tongue piece portion 8 and the central connection portion 3 (location of the bend line 7). However, since geometry of the tongue piece portion 8 (geometry of the tongue piece opening 10) is formed to be narrowest in width at the connection portion and wider on the outside thereof, even when cyclic, tensile or compressive stress, and/or vibration is applied to the connection portion (the connection portion of the tongue piece portion 8 and the tongue piece opening 10), acting force may be largely reduced because the connection portion 3 is situated inside the outer circumference of the right and left tongue piece openings 10.

An outline contour line of the tongue piece opening 10 after the tongue piece portion 8 is cut out has no sharp portion anywhere, and even a linking portion to the tongue piece portion 8 has a blunt angle, therefore it is formed so that it is difficult for stress concentration to occur. For example, outline geometry is arranged to have no edges not greater than 0.3 R in shape of cutting out. In work, because only punch-out and bending are required, a mold is simple in structure and low in cost compared to a conventional one, moreover allowing lesser occurrence of failure and more stable production.

In the conventional technology, because, corresponding to evagination of the central portion cut out, the metal plates are extended across both sides to accumulate large, tensile stress in a start point and/or an end point of cutting out, these points may be a base point of crack due to cyclic, compressive or tensile stress and further vibration added when mounted in an engine, and further when the gasket is mounted in a narrow region such as the water-cooling region 50 provided with the water conduit openings 43 and moreover a thickness of the gasket is thick, this effect may further be increased.

A distance of bending downward of the tongue piece portion 8 can be set to a total thickness of the laminated metal plates 6, 9, plus a distance of vertical offset (clearance gap) between an upper surface of a front end of the undermost tongue piece portion 8 and a bottom surface of the undermost metal plate 9 of the laminated metal plates 6, 9, this distance being as small as possible. Since the connection location 2 is set in the water-cooling region 50, a too large distance of vertical offset may provide a large flow of water from the clearance gap between the tongue piece portion 8 and the tongue piece opening 10. A flow of water supplied to the cylinder head is throttled to adjust flow by the water conduit opening 43, but as the clearance gap becomes too large, accuracy of adjustment drops. From this, as described above, the distance of vertical offset between an upper surface of the undermost tongue piece portion 8 and the undermost surface of the laminated metal plates at a location of the tongue piece opening 10 is set to be small.

Figure 6A:
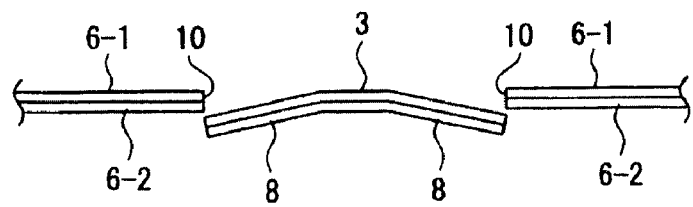
FIGS. 6A and 6B are another schematic views illustrating bend of a tongue piece portion.

Another embodiment of the tongue piece portion 8 is shown in FIG. 6A. As shown, the tongue piece portion 8 does not have a second bend line 11 as in the first embodiment. The tongue piece portion 8 therefore has a smaller inclination. Further, in FIG. 6A, an embodiment is shown in which a shim plate 9 is attached between two base plates 6-1, 6-2 (in this case, the shim plate 9 is situated around a combustion chamber and in a region of water conduit openings), and three plates are connected with each other on the side of the combustion chamber hole, and a case is shown in FIG. 6A in which in a region without the shim plate 9 in the outer circumference, the base plates 6-1, 6-2 are connected with each other.

In the first embodiment, as compared with the case without bending the tongue piece portion 8 shown in FIG. 6A, the tongue piece portion 8 is bent on its way at bend line 11, so a front end 5 thereof is set parallel to the tongue piece opening 10 and the inclined portion 4 of the root side of the tongue piece portion 8 forms a larger angle due to the steeper incline. Then, as seen from the plan view in FIG. 5, the tongue piece portion 8 is pulled in to the side of the connection portion so as to further ensure that coming loose of the metal plates in the lamination direction is prevented. A bend depth of the tongue piece portion 8 can be cut out from the base plate 6 to be larger than a total thickness of the laminated metal plates 6, 9, but because a halfway portion of the tongue piece portion 8 is bent to be parallel to the base plate 6 and formed in shape of step, and further a depth at a step-like portion is made larger than the total thickness of the laminated metal plates, then stronger connection may be provided due to a shorter distance from the base plate 6 to the step-like portion, and being pulled in more inside because of a larger bend angle of the inclined portion 4.

Figure 7:
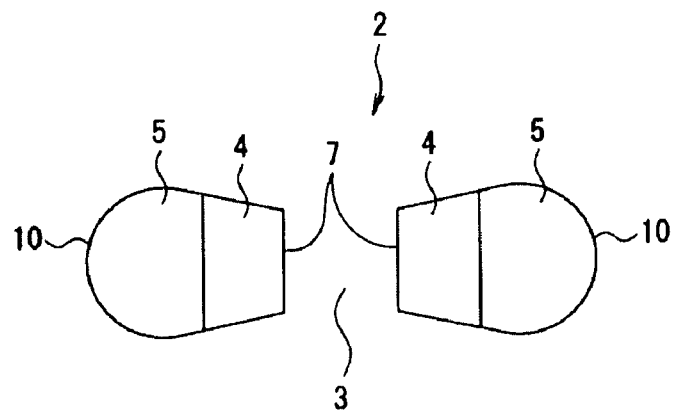
FIG. 7 is a plan view illustrating different geometry of a tongue piece portion.
Figure 8:
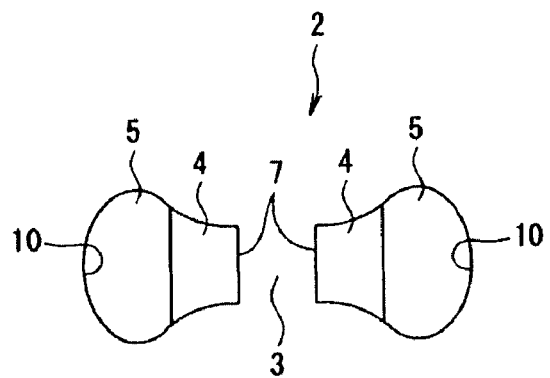
FIG. 8 is a plan view illustrating different geometry of a tongue piece portion.
Figure 9:
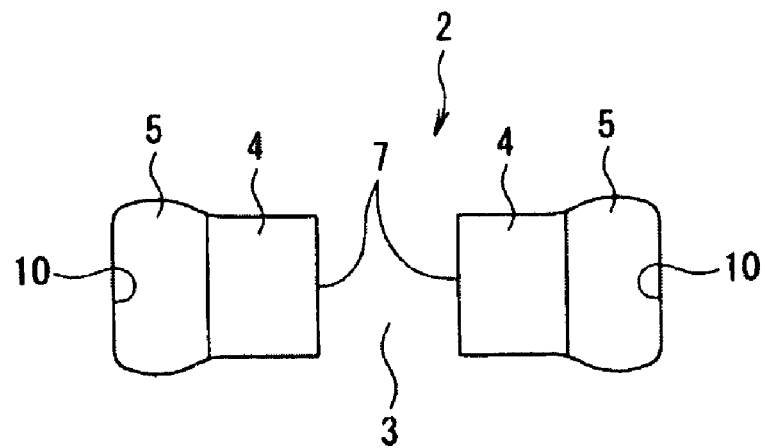
FIG. 9 is a plan view illustrating different geometry of a tongue piece portion.
Figure 10:
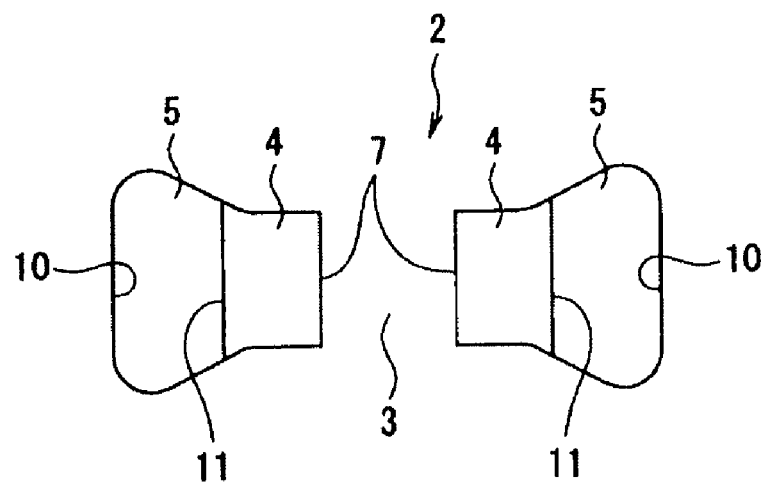
FIG. 10 is a plan view illustrating different geometry of a tongue piece portion.

The geometry of the tongue piece portion 8 is not limited to the geometry aforementioned. For example, the geometry may be formed as shown in FIGS. 7 and 8. Further, when there are a lot of laminated plates and the total thickness of the gasket is thick, a straight portion in the tongue piece portion, as shown in FIGS. 9 and 10, may be adjusted to be longer or shorter according to the thickness. That is, it is only required that a maximal width of the tongue piece portion 8 be wider than a length of the connection portion (bend line 7) with the central connection portion 3.

In FIGS. 9 and 10, when the tongue piece portion 8 is bent downward, because the inclined portion 4 on the root side of the bent portion on its way (bend line 7) is equal to the tongue piece opening 10 in width, then suppression of coming loose may become weak (it may be dealt with by providing a burr described above), but coming loose may be prevented because in the planar portion 5 in a front end of the bent portion on its way, both sides of the tongue piece portion 8 in the width direction face the outer circumference of the tongue piece opening 10 in their upper and lower portion. As seen from these viewpoints, the inclined portion 4 in the tongue piece portion 8 may be also configured to be narrower in width gradually toward a front end thereof. Such a technology may be used when there are a lot of laminated plates and/or thick plates are connected. It is only required that the maximal width of the planar portion 5 be larger than the length of the bend line.

In addition, in the embodiment, an example is shown in which both sides of the tongue piece portion 8 straddling (surrounding) the central connection portion 3 are arranged to be bilaterally symmetrical, but the right and left tongue piece portion 8 may be disposed to be offset to each other in the width direction.

Figure 11:
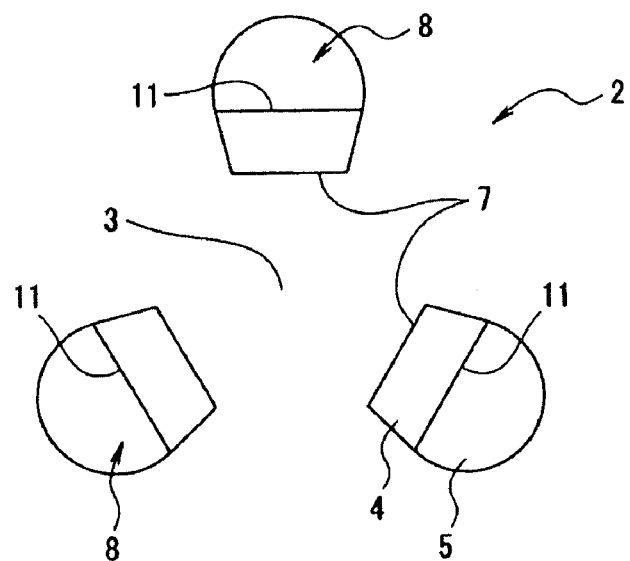
FIG. 11 is a plan view illustrating an example in which three tongue piece portions are disposed at one connection location.
Figure 12:
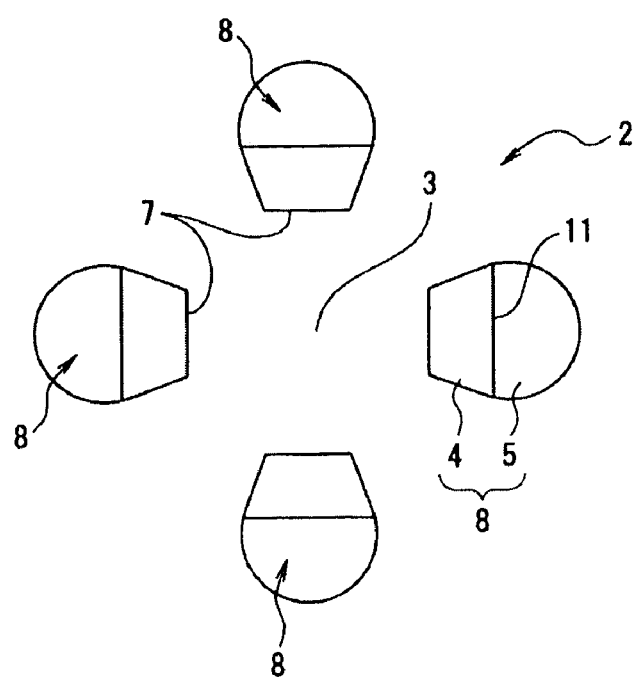
FIG. 12 is a plan view illustrating an example in which four tongue piece portions are disposed at one connection location.

An example is shown in which two tongue piece portions 8 are radially provided centering on the relevant central connection portion 3 to surround the central connection portion 3, but, as shown in FIGS. 11 and 12, an effect of connection may be increased accordingly as three, four or more tongue piece portions 8 are provided. That is, a plurality of notches in shape of tongue piece may be formed to extend radially in the external diameter centering on the central connection portion 3 which is a center for connection, and to be bent in the out-of-plane direction, providing connection. In addition, it is not necessary to space equally apart the plurality of the tongue piece portions 8 adjacent to each other, and/or it is not required that centers of the radial arrangement intersect at one point.

Alleviation of stress concentration on the connection portion of the tongue piece opening 10 and the tongue piece portion 8 due to tensile or compressive stress, and/or vibration during operation may become possible because the connection portion linking to the central connection portion 3 in each tongue piece portion 8 is made to be narrow in width and the plurality of the tongue piece portions 8 are disposed to surround the central connection portion 3 as described above, thus a region which is a connection portion of the tongue piece opening 10 and the tongue piece portion 8 and in which stress concentration is most likely to occur is surrounded.

In the embodiment, for one connection location 2, two or more notches in shape of the tongue piece are provided in combination to ensure connection, but not limited to this. For each connection location 2, only one tongue piece portion may be used respectively to connect. Each tongue piece portion 8 may have a prevention effect at least in the direction of punch-out and a suppression effect on horizontal, relative displacement also in the horizontal direction but not all directions. Connection of laminated metal plates may be realized by adjusting positions of a plurality of the connection locations 2 and orientations of the tongue piece portions 8 at each connection location.

In addition, an example is shown in which the connection location 2 is set in the water-cooling region 50, but when a plurality of the base plates 6 are laminated, a connection location 12 (see FIG. 1) may be also set in an outer circumference of the gasket 1 to connect using the connecting structure. Connection of the gasket formed by laminating a plurality of plates is illustrated as an example, but to any connection of laminated metal plates, the present invention may be applicable and not limited to the metal gasket 1. Because there is a space on the lower side, the tongue piece portion 8 is bent downward in the out-of-plane direction, but when a space is provided on the upper side at a connection location, it may be bent upward in the out-of-plane direction. The connection location is set at a different location from the water conduit opening 43 in the water-cooling region 50, but the tongue piece portion 8 may be formed in punch-out on the water conduit opening 43 and used to connect. In this case, preferably, a front end of the tongue piece portion 8 is cut out so that a length of the tongue piece portion 8 is largely shorter than that of the tongue piece opening 10 (water conduit opening).

Another embodiment will be explained with reference to the drawings. In addition, a similar member to that of the first embodiment may be denoted a similar symbol to explain.

Figure 6B:
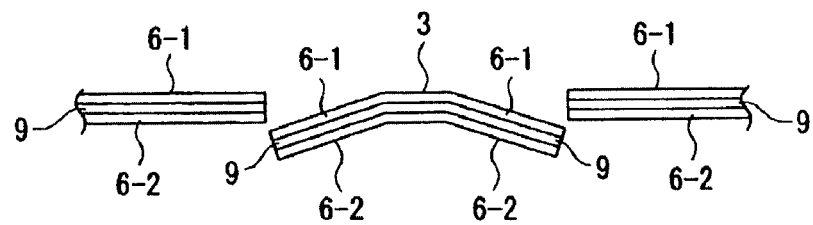

This embodiment will be explained by illustrating an example in which, as similar to FIGS. 6A and 6B, three metal plates 6-1, 9 and 6-2 are laminated to form a metal gasket around a combustion chamber, and these three metal plates 6-1, 9 and 6-2 are concurrently connected with each other. For example, this may be a configuration in which a shim plate 9 is disposed between base plates 6-1 and 6-2. Needless to say, the configuration may be applicable even where two metal plates, and four or more laminated metal plates are connected with each other.

Figure 13:
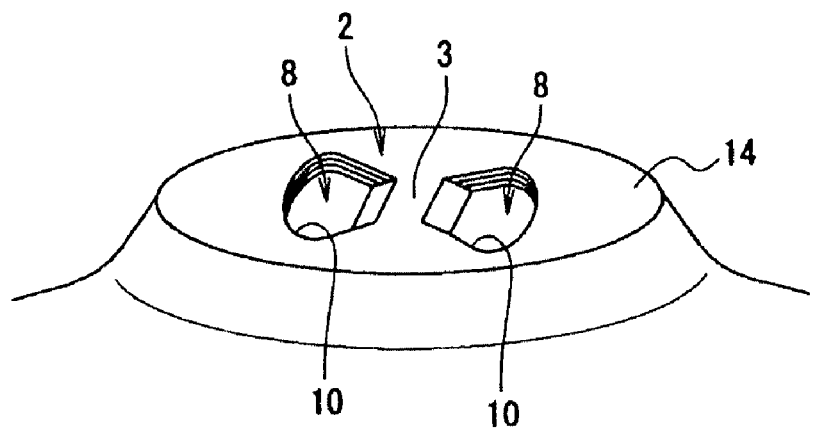
FIG. 13 is a partially enlarged, perspective view illustrating a connecting structure of a second embodiment.
Figure 14:
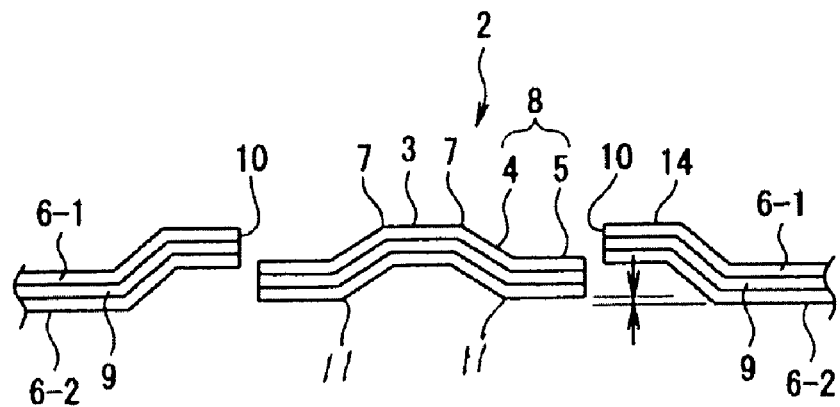
FIG. 14 is a cross-section view illustrating a connecting structure of the second embodiment.

The connecting structure has a basic configuration similar to that of the first embodiment. This connecting structure will be explained with reference to FIGS. 13 and 14.

Similar to the first embodiment, on both sides of a central portion (hereinafter, called central connection portion 3) in an area to be connected respectively, laminated metal plates (the base plates 6-1, 6-2 and the shim plate 9) are concurrently punched out downward (in the lamination direction) in shape of tongue piece by using a pressing machine. A depth of punch-out is made not smaller than a total thickness of the laminated metal plates 6-1, 9 and 6-2. That is, both sides of the central connection portion 3 respectively are punched out by cutting out on one section line along an outline contour in shape of tongue piece to be formed in shape of cantilever beam while the central connection portion 3 is left behind.

Here, a portion formed in shape of tongue piece by punch-out may be called tongue piece portion 8, and an opening formed by punch-out may be called tongue piece opening 10. Then, in the example, on both of the right and left side, the tongue piece portions 8 for connection are formed. A press die is defined in such a manner that, in punch-out, the tongue piece portion 8 is bent downward in the out-of-plane direction at a connection portion linking to the central connection portion 3 which is a root portion, and in addition bent so that a halfway location 11 in the extension direction of the tongue piece portion 8 is parallel to a bend line 7 of the connection portion, providing a stepped difference. Then, a front end 5 of a bent portion on its way is arranged to be situated lower than a lower surface of the undermost metal plate 6-2 of the three laminated metal plates 6-1, 9 and 6-2, and parallel to a periphery of the tongue piece opening 10. In addition, in the following explanation, an inclined portion between the bend line 7 in the tongue piece portion 8 and the bent portion on its way in the tongue piece portion 8 may be called inclined portion 4, and a front end 5 of the inclined portion 4 may also be called planar portion 5.

A punch-out width of the tongue piece portion 8 cut out by punch-out is set to be narrowest in the connection portion 3 and widen gradually toward a front end 5 of the tongue piece portion 8. At the same time of press work, or before or after the press work, an outer circumference including each outer edge of both sides of the central connection portion 3 in the tongue piece opening 10 is entirely evaginated to project upward in the lamination direction (in the out-of-plane direction opposed to a bend direction of the tongue piece portion 8), forming an evagination portion 14. That is, the outer circumference entirely surrounding the tongue piece opening 10 formed to surround the central connection portion 3 is projected and molded to be evaginated upward.

A distance of projection of the evagination portion 14 is set to the same value as a maximal distance of projection of the relevant tongue piece portion 8 or a value incremented by an error so that a lower surface of the tongue piece portion 8 is situated over a lower surface of the outer circumference of the evagination portion 14 in the undermost metal plate 6-2 of the laminated three metal plates 6-1, 9, 6-2. Further, seen from the projection direction, an outline contour of the evagination portion 14 is formed in shape of, for example, circular form so that any sharply-angled portion is not present.

Assuming that the evagination portion is not formed, when the three connected metal plates 6-1, 9 and 6-2 are stored in a storehouse with being lapped over a third metal plate (not shown) or transported, the tongue piece portion 8 bent downward has a predetermined spring effect on the third metal plate, that is, overlaps closely with it while having a predetermined pressure. Then, if the tongue piece portion 8 having the predetermined pressure slides on the third metal plate due to vibration etc. during transportation, the slide may damage the third metal plate. Particularly, when the third metal plate is in contact with and scrapes against a corner of an end face of the outer circumference of the tongue piece portion 8, it may be more likely to gel scratched.

Because the front end of the bent portion on its way in the tongue piece portion 8 is made parallel to the periphery of the tongue piece opening 10, this geometry may allow for alleviation of load on the third metal plate in the end face of the outer circumference of the tongue piece portion 8, therefore getting scratched may less occur by just that much. On the other hand, in this embodiment, provision of the evagination portion 14 causes the tongue piece portion 8 to be situated over a lower surface of the third metal plate 6-2, thus the third metal plate may be prevented from getting scratched by the tongue piece portion 8.

The metal plates 6-1, 9 and 6-2 are evaginated upward, but the notch portion is not evaginated, that is, because an inner, planar portion of the outer circumference entirely surrounding a plurality of tongue piece openings 10 centering on the central connection portion 3 is evaginated, a start point of crack may not be provided. Here, a distance of projection of the evagination portion 14 is set equal to a maximal distance of projection of the tongue piece portion 8, or a distance of projection incremented by just an error, but the distance of projection of the evagination portion 14 may be set to a value slightly smaller than the maximal distance of projection of the tongue piece portion 8. In this case, the tongue piece portion 8 is somewhat projected from the lower surface of the third metal plate 6-2, then the distance of projection is smaller compared to the case with the evagination portion 14 being provided, therefore a possibility of occurrence of scratch on the third metal plate may be lowered by just that much.

The configuration of the tongue piece portion 8 is not limited to this configuration and the configuration of the other embodiments may be applicable accordingly. The metal plates may be evaginated upward centering on the central connection portion 3 along a boundary defined by a location of a border line to surround entirely the outer circumference of the tongue piece openings 10.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A connecting structure comprising:
    two or more metal plates laminated together;
    a connection portion of the two or more laminated plates;
    a first bend line;
    a tongue piece portion formed by cutting concurrently the laminated metal plates in a thickness direction in a tongue-like shape from the connection portion, wherein the tongue piece portion comprises a body portion bent at an angle in an out-of-plane direction from the connection portion at the first bend line, and wherein a length of the first bend line is smaller in length than a maximal width of the tongue piece portion measured parallel to the first bend line; and
    a bend depth of the tongue piece portion in the out-of-plane direction that is equal to or greater than a total thickness of the laminated metal plates,
    wherein the body portion of the tongue piece portion comprises a second bend line, an inclined portion between the first and second bend lines, and a front end of the tongue piece portion extending from the second bend line and bent parallel to a tongue piece opening formed in the laminated metal plates by the cutting, wherein the first bend line, the inclined portion, and the second bend line provide a stepped difference, and
    wherein the tongue piece portion is bent downward of the laminated metal plates to be in a state of being pulled in on the connection portion side, and the front end of the tongue piece portion does not overlap the laminated metal plates.

2. The connecting structure of claim 1, wherein the tongue piece portion widens in width gradually from the bend line.

3. The connecting structure of claim 1, wherein an outline contour of the tongue piece portion has no sharp-angled portion.

4. The connecting structure of claim 1, wherein a plurality of the tongue piece portions are formed in the two or more laminated metal plates all adjacent the connection portion, each extending in a different extension direction from the connection portion.

5. The connecting structure of claim 4, wherein each of the plurality of the tongue piece portions is disposed so that the connection portion is a central portion of a connection location, and the extension direction is away from the central portion.

6. The connecting structure of claim 1, wherein the laminated metal plates form a gasket to be mounted between a cylinder block and a cylinder head, and at least the tongue piece portion is formed at a location overlapped with a water conduit opening formed in the cylinder block or cylinder head.

7. The connecting structure of claim 1, wherein the front end decreases in width as it extends from the second bend line.

8. The connecting structure of claim 1, wherein the bend depth in the out-of-plane direction is equal to or greater than the total thickness of the laminated metal plates plus a depth of the inclined portion.

9. The connecting structure of claim 1, wherein the maximal width of the tongue piece portion is larger than a parallel width in the thickness direction of a tongue piece opening formed in the laminated metal plates by the cutting.

10. A connecting structure comprising:
    two or more metal plates laminated together;
    a connection portion of the two or more laminated plates;
    a first bend line;
    a tongue piece portion formed by cutting concurrently the laminated metal plates in a thickness direction in a tongue-like shape from the connection portion;
    an edge portion of the laminated metal plates surrounding the tongue piece opening; and
    a bend depth of the tongue piece portion in the out-of-plane direction that is equal to or greater than a total thickness of the laminated metal plates, wherein the edge portion is bent in an out-of-plane direction opposite to the out-of-plane direction of the tongue piece portions and wherein the tongue piece portion comprises a body portion bent at an angle in an out-of-plane direction from the connection portion at the first bend line and a length of the bend line is smaller in length than a maximal width of the tongue piece portion measured parallel to the bend line.

* * * * *